Nov. 22, 1938.  E. SCHELLENBURG  2,137,729
APPARATUS FOR THE MANUFACTURE OF AMMONIUM SULPHATE
Filed Dec. 1, 1936
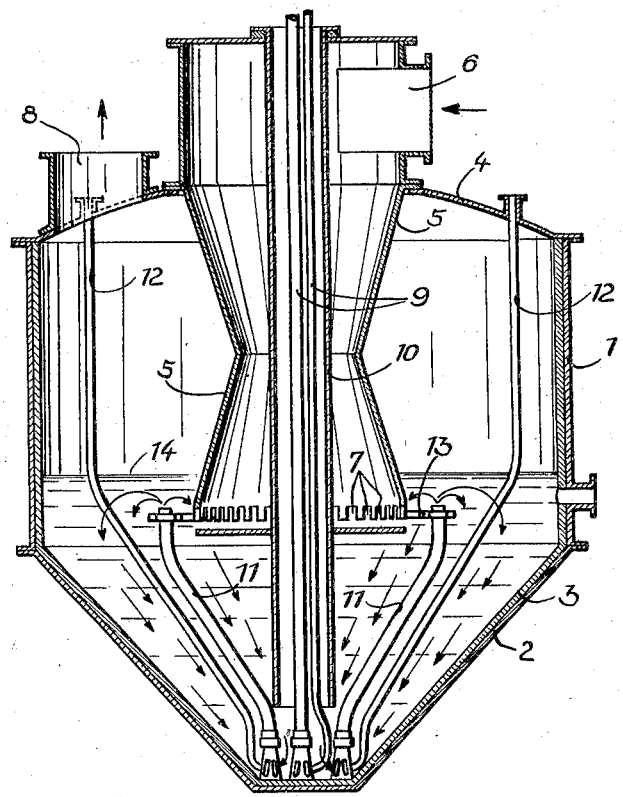
Inventor:
Ernst Schellenburg
By Henry Love Clarke
his Attorney Patented Nov. 22, 1938

2,137,729

UNITED STATES PATENT OFFICE 2,137,729

APPARATUS FOR THE MANUFACTURE OF AMMONIUM SULPHATE

Ernst Schellenburg, Essen, Germany, assignor, by mesne assignments, to Koppers Company, Pittsburgh, Pa., a corporation of Delaware Application December 1, 1936, Serial No. 113,568
In Germany December 2, 1935

1 Claim. (Cl. 23—273)

The invention relates to the manufacture of ammonium sulphate from gaseous ammonia and sulphuric acid in well-known saturators and more especially, in those saturators, which are equipped with means for agitating the saturator liquid and for whirling-up the crystals, deposited on the saturator-bottom, in order to move them back into the reaction zone, near the inlets of the ammoniacal gases.

As the crystals' growth occurs only very slowly, so that no coarse crystals can be obtained by merely passing the gas through an acid saturation bath, several propositions have been made to avoid the production of fine crystals, deposited on the bottom of the saturator. Among others, it has already been suggested to arrange an agitator near the saturator-bottom, by which the crystals accumulating on the bottom of the saturator will be whirled up. Further, it has been tried to blow air or gas free of $NH_3$, under pressure, or another suitable medium, into the bath near the saturator bottom, for the purpose of agitating the liquid.

Other types of saturators are also well-known in which the ammoniacal gas is introduced under pressure into a lower zone of the bath in the bottom of the saturator, whereby the fine crystals precipitating on the bottom are stirred-up by the gas and a rotary movement of the bath liquid is effected.

I have found, however, that all the above suggestions cannot be successfully used in the manufacture of the coarse, crystalline sulphate of ammonia, since they do not whirl-up the crystals from the saturator bottom to such an extent that the crystals are moved upwards into the neutralizing or reaction zone of the saturator bath.

My present invention therefore comprises, providing one or several air-lift ejectors, acting similarly to a sludge pump (in Germany called Mammut-pump) inside the bath compartment of the saturator, in addition to the usual ejector, which serves for the removal of sulphate of ammonia, said ejectors being operated by gas or air under an increased pressure and being so arranged, that the salt from the bottom of the saturator is brought into the neutralizing zone of the saturator bath near the inlets for ammoniacal gas.

Providing such ejectors inside the saturator bath, I have made it possible to maintain the saturator liquid, as well as the crystals precipitating on the bottom of the saturator, in motion without formation of salt incrustations or other troublesome conditions, on the surface of such agitating means, which may have been caused by crystallization of sulphate of ammonia on such means.

In order that the invention may be more readily understood and carried into practice, reference is hereby made to the accompanying drawing, which shows a vertical section through a saturator, designed according to my invention.

The saturator consists of a usual cylindrical vessel 1, and a conical bottom 2, which, if necessary, is lined with acid-proof bricks 3. The saturator vessel and the saturator bottom also may be lined with an acid-proof lead-material.

A central gas intake pipe 5 reaches from the top 4 of the saturator into the interior of the saturator. Said pipe 5 is connected at 6 to the supply for ammoniacal gas or ammoniacal vapours. The end of the intake pipe 5, being equipped with distributing notches 7, dips into the saturator liquid. The ammoniacal gas is finely divided by the notches 7. Thus the fixing of ammonia by means of sulphuric acid is made easier. The gas freed from ammonia leaves the saturator through the pipeline 8.

The sulphate of ammonia formed during the neutralization of the sulphuric acid with ammonia is crystallized out in the saturator bath and gradually accumulates in the deepest part of the saturator bottom 2, from whence it can be removed through a common central air-lift ejector 9, situated in a dip pipe 10, inside the gas intake 5.

In addition to the ejector 9, I have now provided a number of auxiliary air-lift ejectors 11 inside the saturator. Said auxiliary air-lift ejectors are connected to pipelines 12, supplied with air or other gas under increased pressure, which serve for the delivery of the liquor into the air-lift ejectors.

As may be seen from the drawing, the submergence outlet or lower dip end 7 of the gas intake pipe 5 is surrounded by the upper outlet ends of the auxiliary ejectors 11, thus forming a ring of air-lift outlets around the submergence outlet end 7 of the gas inlet pipe 5. The upper ends of the auxiliary ejectors are connected by straps 13 with the gas intake pipe 5.

The outlets of the auxiliary ejectors 11 are placed somewhat underneath the surface of the saturator bath, indicated by line 14. If the auxiliary ejectors are allowed to run, the saturator liquid and the crystals accumulating on the bottom of the saturator are delivered into the neutralizing zone of the saturator bath, i. e. near the outlets of the gas intake pipe.

The suction end of the auxiliary ejectors, as shown on the drawing, is arranged at the same height as the suction end of the salt lifter 9. Under certain conditions, it may, however, also be of advantage to arrange the suction end of the auxiliary ejectors somewhat above the salt lifter end. A selective whirling-up of the sulphate of ammonia crystals from the saturator bottom can be thus attained so that if preferred the fine crystals are returned to the neutralizing zone, whereas the coarse crystals will remain on the saturator bottom near the salt lifter 9.

When operating the saturator according to my invention, the central salt lifter 9 can be manipulated intermittently, preferably while the auxiliary ejectors 11 are shut down. If necessary, arrangements may also be advantageously made for an adjustable supply of gas and air under increased pressure into the auxiliary ejectors, so that the height of the suction relative to the outlet end of the auxiliary ejectors 11 can be regulated. By providing such arrangements, it will be possible to regulate the operation of the saturator in such a way as to accommodate it to the manufacture of sulphate of ammonia, having the desired grade of crystals, under all working conditions.

The number of auxiliary ejectors 11 is dependent essentially on the diameter of the saturator. Usually, it will be sufficient to provide 3-4 auxiliary ejectors which, by suitably controlling their quantity of the delivery, can be adjusted to obtain a uniform distribution of the crystals over the whole circumference of the gas intake pipe 5.

I have now described my present invention on the lines of a preferred embodiment thereof, but my invention is not limited in all its aspects to the mode of carrying out as described and shown since the invention may be variously embodied within the scope of the following claim.

I claim:

Saturator apparatus for manufacture of coarse crystalline sulphate of ammonia comprising a saturator vessel adapted to contain a reactant bath; a central gas inlet pipe of large cross-section arranged in said vessel for submergence of its lower discharge end in a bath in the vessel, and having at its lower discharge end a circumferential gas outlet for introducing gas from the inlet pipe circumferentially thereof into a bath below the level of the vessel for the surface thereof, a gas outlet communicating with said vessel above the level for the bath in the vessel; a primary air-lift ejector arranged in the vessel for removal of solid salts from the bottom of the vessel to outside the same, and a plurailty of auxiliary air-lift ejectors arranged in the vessel for submergence inside a bath when therein with their inlets near the bottom of the vessel and their outlets reaching to and terminating circumferentially around the outside of the circumferential gas outlet of the central pipe, for elevation and discharge of a bath content from the bottom of the vessel into the portion thereof where gas from the central pipe will first diffuse into the vessel upon leaving circumferential gas outlet of the central pipe.

ERNST SCHELLENBURG.